(12) United States Patent
Bertram et al.

(10) Patent No.: US 10,935,938 B1
(45) Date of Patent: Mar. 2, 2021

(54) LEARNING FROM OPERATOR DATA FOR PRACTICAL AUTONOMY

(71) Applicant: Rockwell Collins, Inc., Cedar Rapids, IA (US)

(72) Inventors: Joshua R. Bertram, Ames, IA (US); Angus L. McLean, Bradenton, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 925 days.

(21) Appl. No.: 15/629,555

(22) Filed: Jun. 21, 2017

(51) Int. Cl.
*G01C 3/00* (2006.01)
*G05D 1/00* (2006.01)
*G05D 3/00* (2006.01)
*G06F 7/00* (2006.01)
*G06F 17/00* (2019.01)
*G05B 13/02* (2006.01)
*G06N 20/00* (2019.01)

(52) U.S. Cl.
CPC ......... *G05B 13/0265* (2013.01); *G06N 20/00* (2019.01)

(58) Field of Classification Search
CPC .... G05B 13/0265; G06N 20/00; G06N 3/063; G08G 5/0021

USPC ............................................................. 701/3
See application file for complete search history.

(56) References Cited

U.S. PATENT DOCUMENTS

| 2009/0294573 | A1* | 12/2009 | Wilson | B64D 5/00 244/2 |
| 2015/0178620 | A1* | 6/2015 | Ascari | G06N 3/063 706/21 |
| 2015/0187224 | A1* | 7/2015 | Moncrief | G09B 9/24 434/30 |
| 2018/0082596 | A1* | 3/2018 | Whitlow | G08G 5/0021 |

* cited by examiner

*Primary Examiner* — Mahmoud S Ismail
(74) *Attorney, Agent, or Firm* — Suiter Swantz pc llo

(57) ABSTRACT

Machine learning, evaluating, and reinforced learning within systems or apparatuses enables autonomy to a complexity level beyond automation. Inferences are made using machine learning based on observations, images, or video feed of operator input. The inferences are evaluated or classified and maneuvers are performed based on the evaluating or the classification. The performed maneuvers may be further evaluated for scoring or weighting. The reinforcement learning may perform updates based on the scoring, weighting, and a maximizing reward function such that the machine learning is constantly improving.

7 Claims, 11 Drawing Sheets

LEARNING FROM OPERATOR DATA FOR PRACTICAL AUTONOMY

The present application is related to the following listed application(s) (the "Related Applications"). All subject matter of the Related Applications and of any and all parent, grandparent, great-grandparent, etc. applications of the Related Applications is incorporated herein by reference to the extent such subject matter is not inconsistent herewith.

RELATED APPLICATIONS

The present application is related to U.S. patent application Ser. No. 15/629,548, entitled SAFE AND SECURE PRACTICAL AUTONOMY, naming Joshua R. Bertram, Brian R. Wolford, Angus L. McLean, and Alexander V. Roup as inventors, filed Jun. 21, 2017.

BACKGROUND

Artificial intelligence (AI) systems are becoming increasingly popular. As these systems are incorporated into machines, the machines are able to perform rudimentary tasks previously performed by humans. The use of these types of machines is often referred to as automation.

With its many advantages, it is important to point out that automation has its limits. Movement by machines is often choppy or robotic. Further, the cognitive abilities of automated machines although constantly increasing, appears to be reaching an upper bound as compared to human cognitive capacity. In other words, if automated machines were compared on an axis of complexity in terms of how complex of a problem they can solve versus the human cognitive capacity, current machines appear to be limited or bounded with a significant gap existing between what machines can do and what can be done by the human mind. Because machines found at higher points along the complexity curve are more valuable, improvements to algorithms and hardware are needed to improve the abilities of current machines.

In the avionics industry, Flight Management Systems (FMS) and autopilots have been improved sufficient to enable solutions to well-defined problems such as fuel optimization and level, predictable flight. However, with increasing unpredictability or unforeseeable circumstances, even these systems cannot replace human intuition.

SUMMARY

In one aspect, embodiments of the inventive concepts disclosed herein are directed to a system for learning practical autonomy. The system may include a machine learning module that utilizes an implicit machine learning algorithm. The machine learning module may perform or direct steps, where the steps performed or directed by the machine learning module may include: receiving one or more inputs to generate an output that tracks or trains against the one or more inputs, the one or more inputs including operator response data and the output including one or more control system commands, at least one input of the one or more inputs received from an observing or imaging sub-system; assigning or classifying a state based on a sample-based representation that correlates the operator response data to the state; and evaluating one or more maneuvers responsive to the state to generate an evaluation gradient. In a further aspect, the system may include a control system communicatively coupled to the machine learning module to receive the one or more control system commands and perform a maneuver for a machine based on the evaluation gradient.

In a further aspect, embodiments of the inventive concepts disclosed herein are directed to an apparatus for learning practical autonomy. The apparatus may include a non-transitory memory having instructions thereon and a processor in communication with the non-transitory memory, where the processor may be configured to access the instructions to perform or direct steps of an implicit machine learning algorithm. The steps of the implicit machine learning algorithm may include: receiving a first set of inputs to output a state, the first set of inputs including machine or operator inputs; receiving a second set of inputs to output one or more vehicle control system commands, the second set of inputs including sample-based inputs; and receiving a third set of inputs to output a gradient, the third set of inputs including evaluator inputs, wherein the vehicle state, the one or more vehicle control system commands, and the gradient are estimated, inferred, or learned by the implicit machine learning algorithm based on observations or images of the first, the second, or the third set of inputs.

In a further aspect, embodiments of the inventive concepts disclosed herein are directed to a method for learning practical autonomy. In one aspect, the method may include acquiring vehicle-operator data from a database including operator response data, the operator response data being observed or imaged data responsive to a first vehicle state. In another aspect, the method may include estimating a second vehicle state based on sensor data from one or more sensors of the vehicle and the vehicle operator data, the estimating using a machine learning algorithm. In another aspect, the method may include performing or simulating the maneuver based on the estimated second vehicle state and based on a tracking or training of vehicle control system commands against the operator response data. In another aspect, the method may include evaluating the performing or the simulating of the maneuver to assign a quality metric to the maneuver, the simulating, or the performing. In another aspect, the method may include updating the maneuver, the simulating, or the performing the maneuver based on the assigned quality metric.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
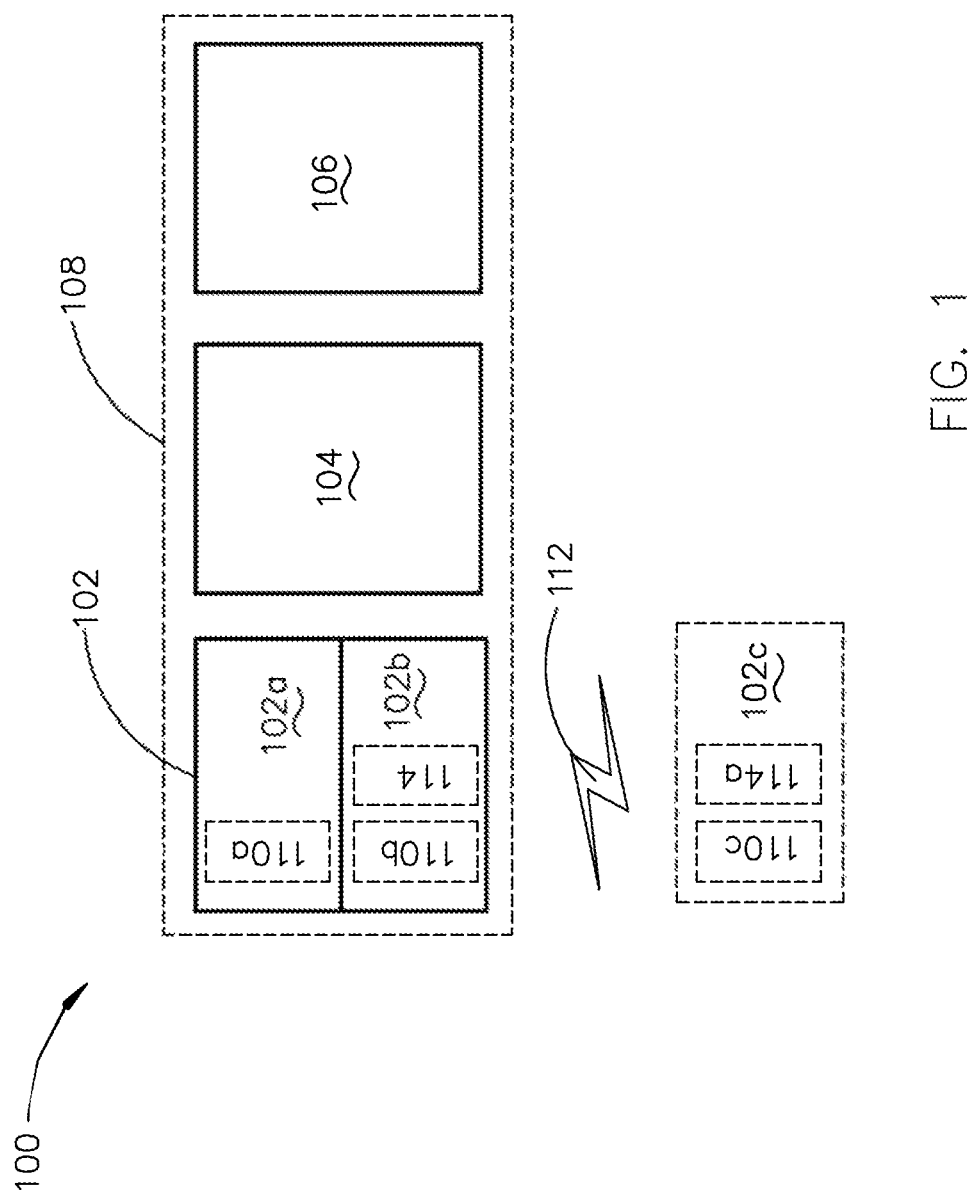
FIG. 1 is an exemplary embodiment of a block diagram of a system for practical autonomy using machine learning, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

"Autonomy" or "autonomous" as used herein shall mean an ability to perform a task at a level of complexity akin to the complexity of human intuition. The higher a system is on the complexity curve, the more autonomy the system has, and all the more value will be attached to that system.

"Automation" as used herein shall mean the use of machinery to perform tasks normally performed by humans, being bounded or limited on an optimization curve with respect to the difficulty of tasks the machinery can perform. In other words, although automated systems may be increasingly optimized, even the most optimized automated system does not cross a gap that exists between optimized automated systems and autonomous systems.

"Maneuver" as used herein shall mean the use of kinematic and potential forces to produce a movement or a series of movements, which are usually performed by an object, machine, or vehicle, with respect to another object, machine, or vehicle (e.g., evasive, tactical, and/or formation maneuvers).

"Memory" as used herein, and unless otherwise specified, means any storage medium known in the art suitable for storing program instructions executable by an associated one or more processors (e.g., computer executable program code). Memory may also be stored in an organized format, encompassing, for example, a database. Memory may include one or more storage mediums. For example, memory may include, but is not limited to, a read-only memory, a random access memory, a magnetic or optical memory device (e.g., disk), a magnetic tape, a solid state drive, or combinations thereof. In embodiments, memory includes a buffer (e.g., frame buffer) and/or a cache. The memory includes non-transitory memory. In embodiments, the memory may be located remotely with respect to the platform.

"Processor" as used herein means any processing device, including but not limited to, a microprocessor, an application specific integrated circuit (ASIC), a field programmable gate array (FPGA), a central processing unit (CPU), an arithmetic logic unit (ALU), a digital signal processor (DSP), or combinations thereof.

"Module," "block" or "sub-block" as used herein means a combination of hardware and software configured to perform one or more steps, processes and/or algorithms of the inventive concepts disclosed herein.

"Practical" as used herein with respect to autonomy or an autonomous system means capability of a system to take a complex multivariate task and implicitly determining one or more automated solutions for performing the task based on observed/imaged responses, a set of rules, a set of contingencies, a set of conditional statements, and combinations thereof.

"Trace" as used herein means a sequence of visible or observable events representing a possible behavior. For example, the possible behavior may be how a maneuver is performed.

Broadly, the inventive concepts disclosed herein are directed to adaptable systems, apparatuses, methods and/or algorithms that utilize machine learning to interoperate with and learn from human intuition. Algorithms utilize implicit analysis to produce smooth outputs that mimic or train against human responses to definable states.

It is noted that while specific examples, depictions, or exemplary embodiments may reference an aircraft or avionics, persons skilled in the art will recognize the inventive concepts are equally applicable to any precision guided vehicle, including water, naval, land-based, tactical, or other similar vehicles and/or vessels.

Referring now to FIG. 1, a block diagram of an exemplary embodiment of an autonomous system 100, according to the inventive concepts disclosed herein is shown. The system 100 includes an observation sub-system 102, a machine learning sub-system 104, and a control sub-system 106.

In some embodiments, the system 100 is located on a platform 108. The platform 108 may be any machine or vehicle that uses AI to determine an output based on inferences and observations. For example, the platform 108 may include, but is not limited to, a manned or unmanned aerial vehicle (UAV), an unmanned aircraft system (UAS), and a tactical vehicle.

In some embodiments, the observation sub-system 102 includes an input sensor 110. For example, input sensor 110 may include one or more of a digital camera, a 2D camera, a 3D camera, a stereo camera, or combinations thereof. In an exemplary embodiment, the observation sub-system 102 is tasked with obtaining one or more observable parameters. For example, the one or more observable parameters may include images or video feed of real-world features. However, the real-world features imaged may be in one or more different locations and/or directions with respect to platform 108. For example, observation sub-system 102a may be positioned to observe or image real-world features outside of or beyond platform 108. For instance observation sub-system 102a may located on platform 108, which is a wingman aircraft, and be configured to image real-world features of a wing, a tail, or an entire body of a lead aircraft.

Observation sub-system 102b may function similarly to observation sub-system 102a except that observation sub-system 102b may be directed towards observing observable operator input. For example, observation sub-system 102b may be located within platform 108 to obtain observations or images of operator input responsive to a first platform state. For instance, observation sub-system 102b may image throttle or control stick movements during the performance of a maneuver performed in response to the state of the wingman aircraft in the environment (e.g., the wingman is "acute", or ahead of the 45 degree bearing line, with respect to the lead aircraft).

Observation sub-system 102c may function similarly to observation sub-system 102a or 102b except that observation sub-system 102c may be located remotely with respect to platform 108. For example, platform 108 may be a UAV or UAS and the observation sub-system 102c may be tasked with observing or imaging input from an operator that is controlling the UAV or the UAS and is located at a remote facility. In this regard, platform 108 may be communicatively coupled to the remote facility via a data link 112 (e.g., Ethernet, Link16, and/or Control and Non-Payload Communications (CNPC) link such as a CNPC-1000 data link).

In some embodiments, the observation sub-system 102 includes a microphone 114 or other user input device for obtaining operator verbal commands. For example, an operator may speak and provide verbal input regarding a maneuver the operator will perform. In this regard, microphone 114 captures the spoken or verbal input. It is noted that microphone 114a functions similarly to microphone 114 except that microphone 114a may be located at a remote facility to capture a verbal input from an operator of a UAV or a UAS.

In some embodiments, the machine learning sub-system 104 uses a machine learning algorithm such as a neural network (e.g., neural net), a Viterbi algorithm, a Markov model, a hidden Markov model, a Markov chain, a Kalman filter, other dynamic Bayesian Networks, or combinations thereof.

In some embodiments, system 100 is configured to perform one or more modes or according to one or more phases of a process. In some embodiments, the performance of phases may be sequential. For example, system 100 may reside in a first one or more phases for a period of time before moving to a second one or more phases, until the system 100 completes a cycle by producing machine output that mimics, traces, or trains against a human response. In other embodiments, the performance of phases or portions of phases may be simultaneous. For example, system 100 may perform two or more separate machine learning algorithms for two or more different phases simultaneous with each other. In an exemplary embodiment, the phases may include, but are not limited to, a data acquisition phase, a data processing phase, a state estimation phase, a maneuver performance phase, and an evaluation phase.

In some embodiments, individual or combined components of system 100 are implemented with a processor and memory as a system-on-chip (SOC), an application specific integrated circuit (ASIC), a Field Programmable Gate Array (FPGA), a line replaceable unit (LRU), or combinations thereof. In other embodiments, individual or combined components of system 100 are implemented as separate partitions configured to be accessed by an operating system such as an ARINC 653 operating system.

Data Acquisition

Figure 2:
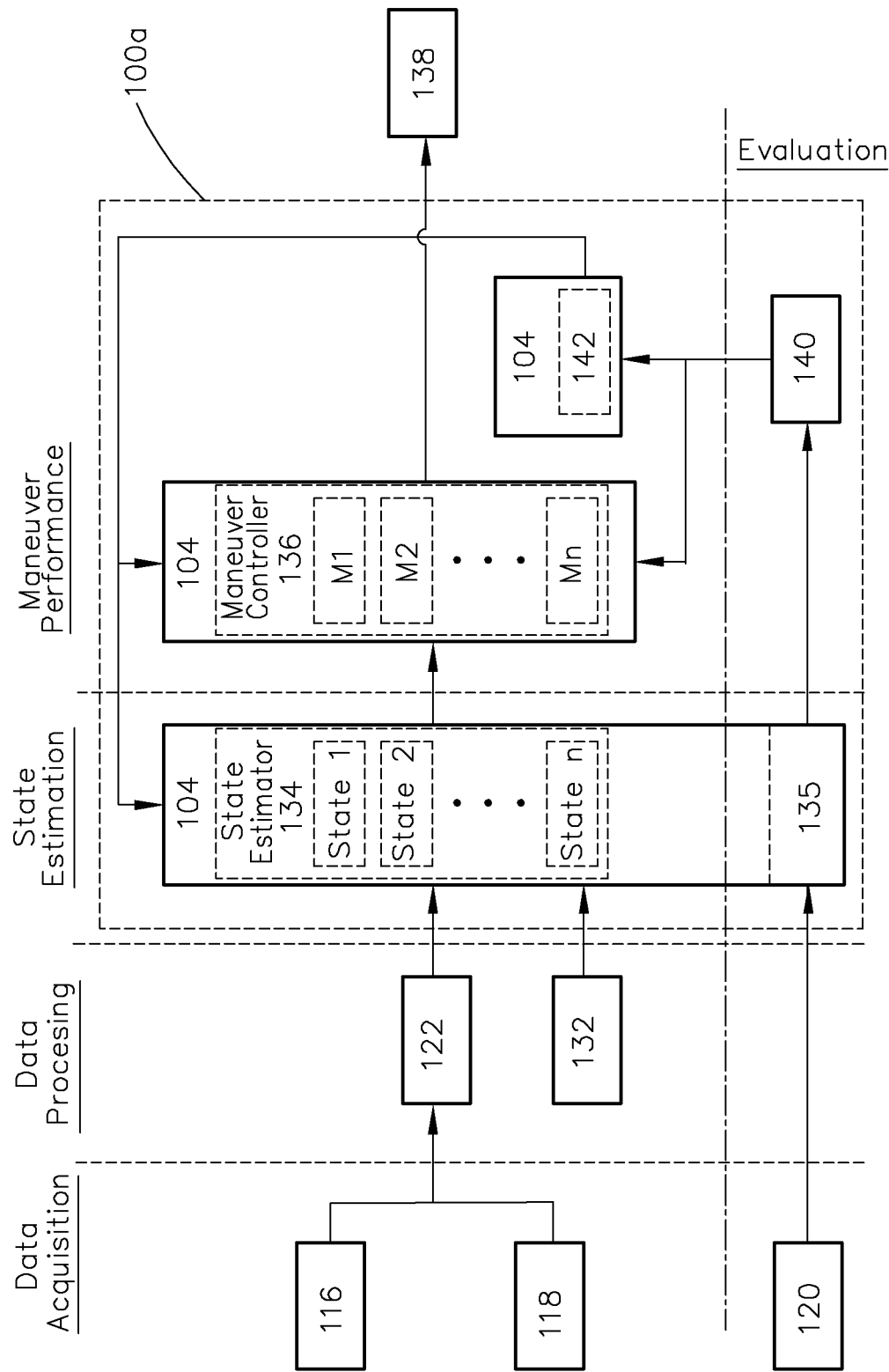
FIG. 2 is another exemplary embodiment of a block diagram of a system for practical autonomy using machine learning, according to the inventive concepts disclosed herein.

Referring now to FIG. 2, in some embodiments the system 100a receives input from first components for acquiring 116 (e.g., sensors, displays, interactive graphical user interface (GUI), memory, etc.). The first components for acquiring 116 may be configured to acquire sensor data or perform a first portion of the data acquisition phase. For example, the platform of system 100 may be communicatively coupled with a radar system or test range equipment such that the sensor data may include vehicle position- and/or time-dependent tracking data. For instance, the sensor data may include, but is not limited to, radar returns (e.g., passive radar, pseudo mono-static, forward scatter, bistatic radar, continuous-wave, Doppler, FM-CW, pulse-Doppler, etc.), flight track data, high-precision position (e.g., from GPS carrier-phase data), velocity, and acceleration data, a form of relative positioning data (e.g., differential GPS data or real-time kinematics (RTK) data, data from a visual relative navigation system including a first camera-based system (rel-nav), simultaneous localization and mapping (SLAM), etc.), ADS-B signals, sound and signal emissions versus position and/or time, heat signature versus position and/or time, and combinations thereof.

It is noted that system 100a may function similarly to system 100 except that system 100a may be implemented as a single device. For example, system 100a may be implemented as or within an ASIC, a portable device such as a tablet computer, a FPGA, a SOC, or combinations thereof.

In some embodiments, the system 100 (e.g., 100 or 100a) receives input from second components for acquiring 118 (e.g., sensors, displays, interactive GUI, memory, etc.). The second components for acquiring 118 may complete a second portion of the data acquisition phase.

In some embodiments, the second components for acquiring 118 may acquire first platform state data and operator input responsive to the first platform state. For example, the platform 108 of system 100 may be communicatively coupled with the observation sub-system 102b or 102c for obtaining images and receiving verbal operator input. For instance, the observation sub-system 102b or 102c may image yoke, stick, and/or throttle positions as a pilot responds to different scenarios or the first aircraft state. By way of another example, system 100 may be communicatively coupled to the flight management system (FMS) to infer or to extract this information as the operator reacts to different scenarios or the first platform state. For instance, during the second portion of the data-acquisition phase, the observation sub-system 102b or 102c may be communicatively coupled with an audio input system (e.g., microphone 114 and voice recognition software/firmware/hardware), and the pilot of the aircraft may be asked/prompted to audibly communicate a first platform state as well as the response the pilot intends to take in response to the first platform state. In this regard, during a training exercise involving platform 108 that is an aircraft the pilot may audibly say or provide the following audio input, "Parade turn-closing too fast-response: underrun." The observation sub-system 102b or 102c may use voice recognition/validation software to receive the audio input from the pilot and record aircraft sensor input (e.g., aileron angles, elevator angles, speed, throttle position, yoke position, air brake input, etc.) that correlates with the first state of the aircraft and the pilot response.

In some embodiments, when the aircraft comes out of a maneuver (e.g., sensor data indicates level flight), the voice recognition/validation software may verify the audio input given by the pilot. For example, after coming out of a turn, if the pilot provided audio input regarding the maneuver, then the observation sub-system 102 may prompt the pilot for confirmation about the maneuver performed. The pilot may provide an audible confirmation or may touch a haptic device (e.g., touch screen) to confirm the maneuver performed and/or the first platform state. In other embodiments, the actual pilot response may be confirmed by a review of the sensor data. For example, the act of coming out of a turn may be detected by the observation sub-system 102 as it measures a directional control system output (e.g., aileron angle decreased to level position, elevator angle at resting position, etc.) from a flight control system (FCS).

In some embodiments, a system 100 may be configured to embed or position a data flag in recorded data. For example, an operator may be too engulfed in an exercise to remember or have time to provide the audio input just prior to performing a command or maneuver. In some embodiments, in order to improve the data processing phase, the observation sub-system 102 may flag a portion of a recorded state of operation (e.g., flight track data) where no verbal input was received. For instance, the flag may be triggered by an operator control command that is not accompanied with a verbal input. In other embodiments, the trigger for the data flag may be due to operator input and a time associated with that input. For example, the observation sub-system 102 may be connected to the FMS or an FCS, and an aileron or an elevator may be activated by the pilot for a set duration of time, such as two or three seconds or more. Due to the activation of the aileron or elevator for the set duration of time, the observation sub-system 102 may place a flag (e.g., data bit) in the flight track data that corresponds to the extended period of input. The flags enable an operator or a well-defined processing algorithm to review (e.g., in the data processing phase) the flight track data and determine if the flag does in fact correspond to a maneuver. In some embodiments, the operator or the well-defined processing algorithm also classifies the maneuver that was performed.

In other embodiments, the data flag may be used to indicate a portion of vehicle-operator data that does not correspond to a recognized maneuver. For example, sample-based representations of maneuvers may have been input into the machine learning sub-system 104 such that a data processor (e.g., data processor 122, below) reviewing flight track data may flag a sequence of control output or an evasive maneuver performed in response to an emergency situation. These flagged portions may be reviewed by an operator for assigning of one or more additional classifications. For instance, if the preconditions of the emergency situation and the maneuver resulting from them are valuable for future instruction and/or performance, a new classification may be given by the operator for the emergency state, such as "emergency condition #1", and for the maneuver, such as "emergency underrun #1".

In some embodiments, the system 100 includes third components for acquiring 120 (e.g., sensors, displays, interactive GUI, memory, etc.). The third components for acquiring 120 may complete a third portion of the data acquisition phase. For example, the third components for acquiring 120 may acquire instructor or evaluator grading data of the operator input responsive to the first platform state. For instance, an instructor may grade maneuvers performed responsive to the first platform state, and the grade or the score may be input as binary input or as a string to be used as a metric for evaluating the performance of subsequent maneuvers or for "self-grading" performed by the system 100.

In some embodiments, the first components for acquiring 116, the second components for acquiring 118 and vehicle sensors may be wired or wirelessly coupled (e.g., via Bluetooth, infrared, Ethernet, etc.) with components of system 100 (e.g., machine learning sub-system 104). In other embodiments, the third components for acquiring 120 are also wired or wirelessly coupled to components of system 100.

It is noted that while components for acquiring are depicted as separate portions coupled with system 100, the separate portions may be interconnected or combined in some embodiments. For example, the first, second, or third components for acquiring 116, 118, or 120 may share individual components such as the interactive GUI among each other and still be encompassed in the inventive concepts disclosed herein.

In some embodiments, the system 100 includes components for accessing previously acquired and stored operator data. For example, system 100 may include means for accessing a database, non-transitory memory, or other computer readable medium, such as a port, a wired or wireless datalink, a data bus, a switch, a router, an interactive GUI, or combinations thereof.

In some embodiments, the first portion, the second portion, and the third portion of the data acquisition phase occur substantially simultaneously. In some embodiments, the first, second, and third portion may occur sequentially (e.g., one after the other), where the sensory data was recorded for different segments corresponding to the data collected in the first and second portion of the data acquisition phase and instructor/evaluator grading data collected regarding individual segments and corresponding sensory data.

Data Processing

It is noted that the first state of the platform 108 may occur during training or during a calibration of system 100. It is further noted that the first state may include multiple states including various respective states that may have occurred during the training or calibration. Further, the same state may have occurred multiple times or have received a response from multiple different operators. In this regard, data processing by one or more data processors 122 may be utilized to process, convert, extract, or format data such that the data may be input into the machine learning sub-system 104.

In some embodiments, data processor 122 samples, slices, and otherwise formats the data into a sample-based representation including one or more relative positions of a second aircraft with respect to a first aircraft at one or more points in time along a flight path, where the flight path and corresponding input may be recorded as flight track data.

Figure 3:
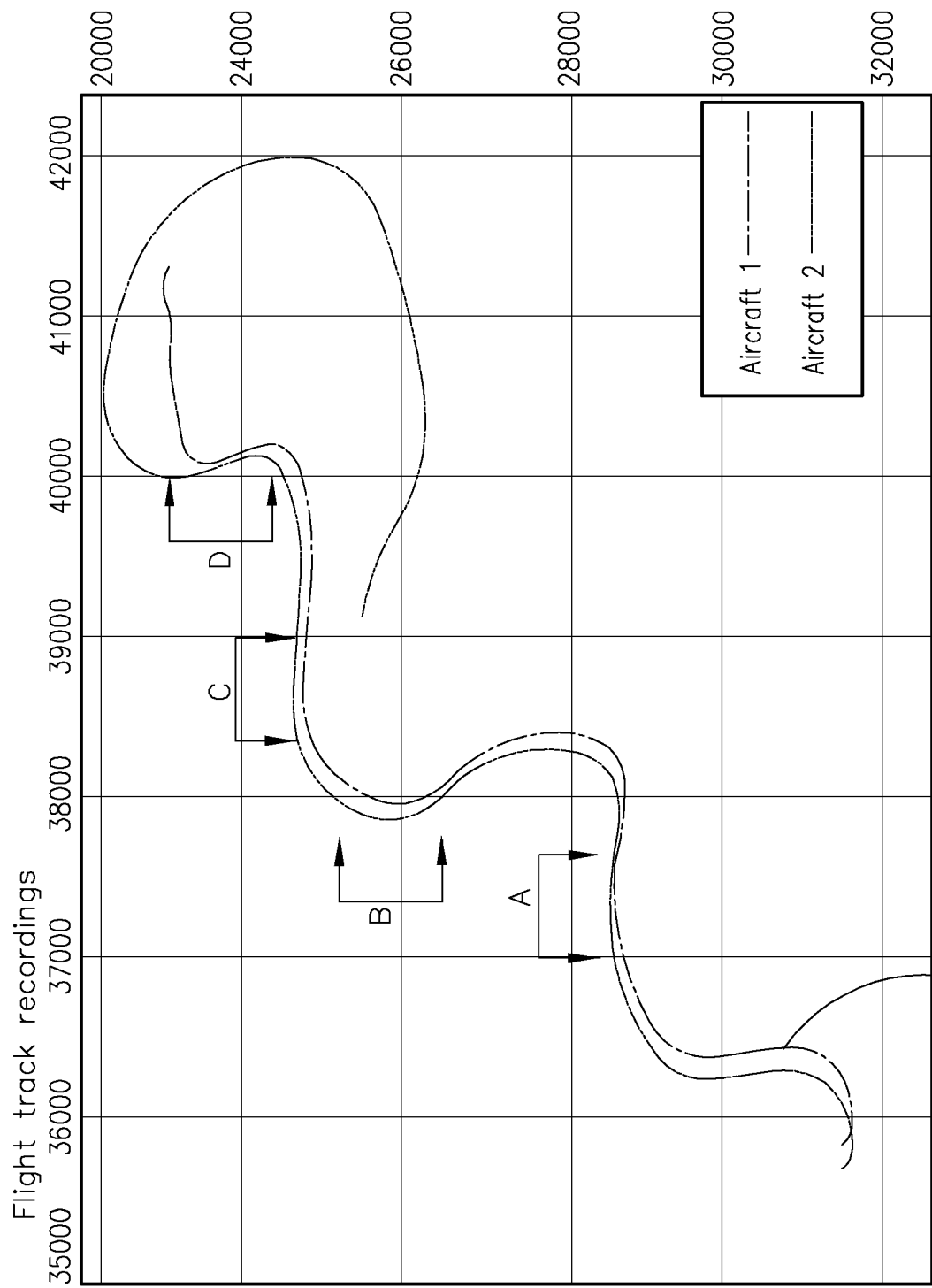
FIG. 3 is an exemplary embodiment of recoded platform or vehicle data, according to the inventive concepts disclosed herein.

Referring now to FIG. 3, the data processor 122 may segment or slice two- or three-dimensional (2D or 3D) mapping data (e.g., flight track data 124) into respective segments (e.g., segments A, B, C, and D) to analyze one or more maneuvers performed during a respective segment and classify the maneuver or assign a name/representation to the maneuver.

Figure 3B:
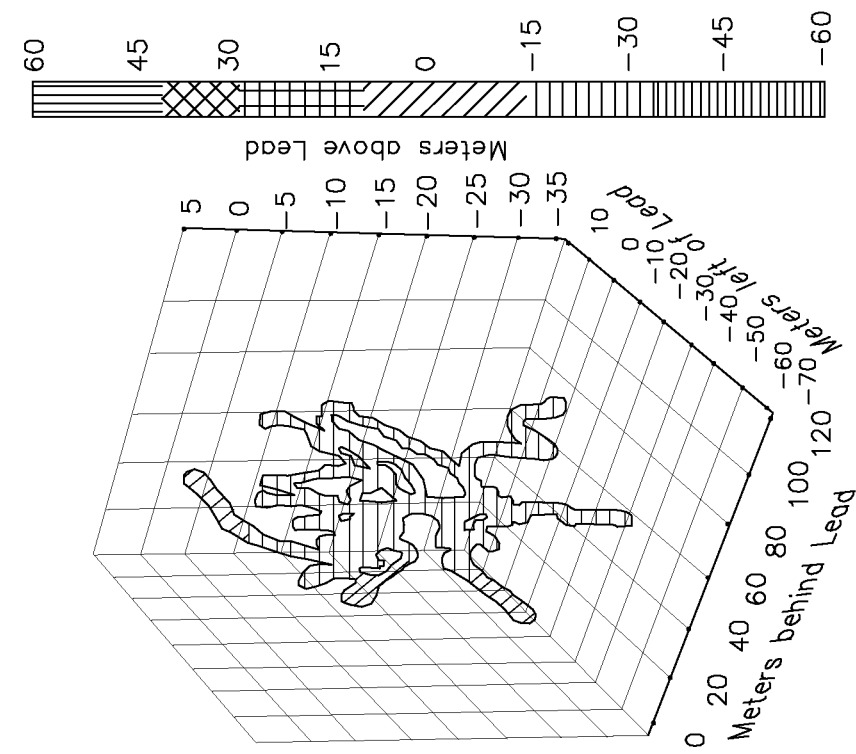
FIGS. 3A-3D are exemplary embodiments of recorded sensor data and operator data, according to the inventive concepts disclosed herein.
Figure 3A:
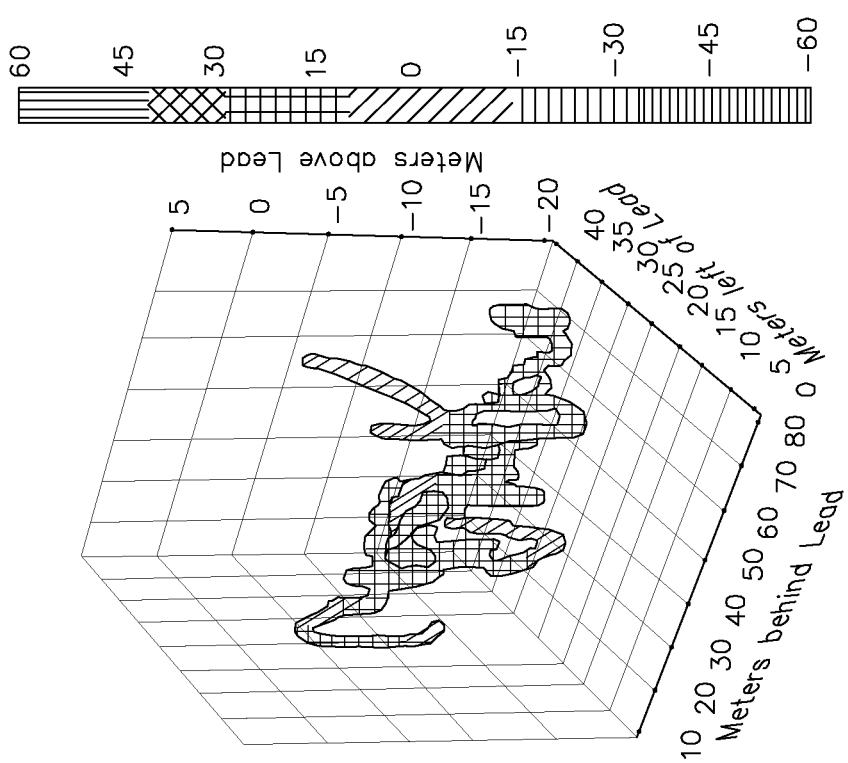
Figure 3D:
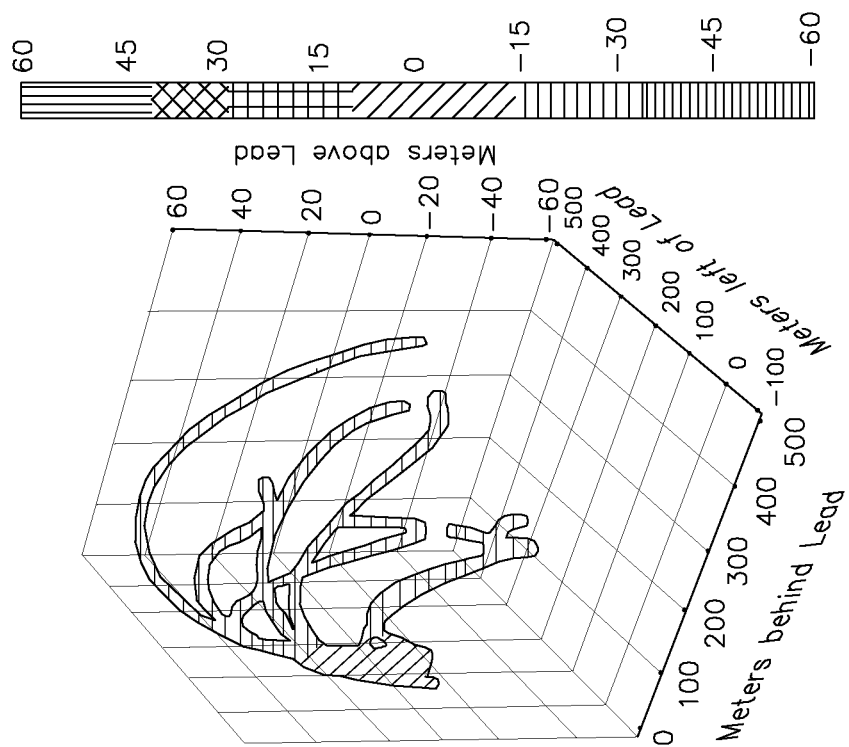
Figure 3C:
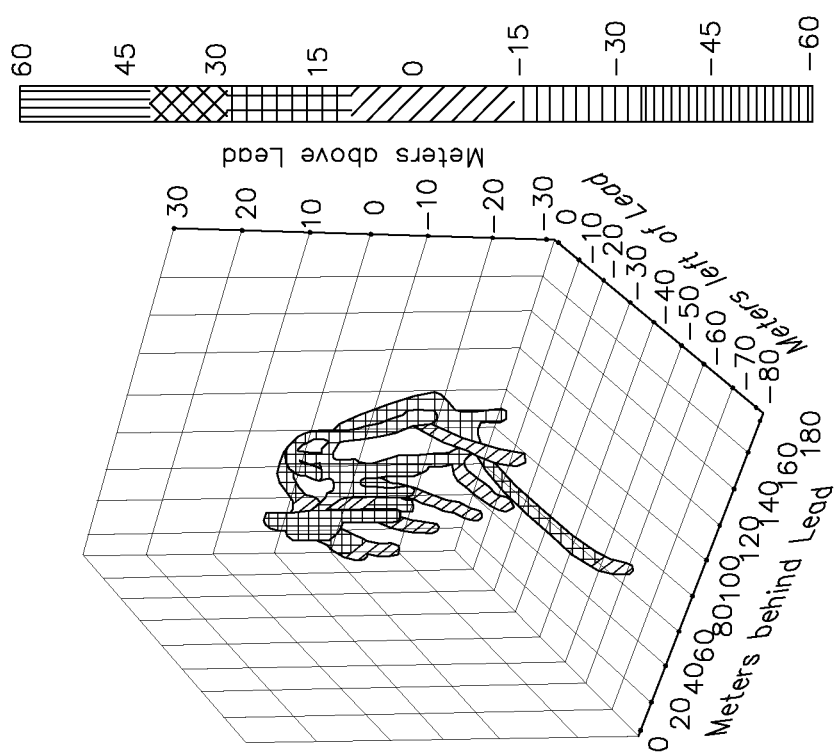

In some embodiments, the data processor 122 classifies or assigns maneuvers based on a distinctive signature of a maneuver or on unique patterns created by operator input and sensor data as the maneuver is performed. For example, referring now to FIGS. 3A-3D unique patterns of respective maneuvers performed multiple times are aggregated and mapped in a volume with sensor parameters being the three axes of the volume and another metric such as a color or a line hatching of the graph lines indicating operator input. For instance, FIG. 3A represents a "turn into" maneuver performed during formation flight with "meters above the lead" on the x-axis, "meters left of the lead" on the y-axis, "meters above the lead" on the z-axis, and a color spectrum (e.g., depicted with different line hatching) indicating an amount or angle of turn. Similarly, FIG. 3B represents a "turn away" maneuver, FIG. 3C represents a second "turn into" maneuver, and FIG. 3D represents a "break-up" maneuver.

It is noted that on the line hatching spectrum, vertical hatching represent right turns, diagonal hatching represents straight-and-level flight, while horizontal hatching represent left turns, with different hatching patterns representing the transitional turn portions. For example, FIG. 3A is mostly a patch and diagonal-patch hatching, with some diagonal hatching at short intervals, while FIG. 3B includes mostly narrow-horizontal and wide-horizontal hatching with some diagonal hatching at short intervals, while FIG. 3C includes mostly diagonal, patch, and some diagonal-patch hatching, and FIG. 3D includes mostly wide-horizontal, diagonal, and some narrow-horizontal hatching.

It is further noted that the different axis, color, or hatching representations of FIGS. 3A-3D are not meant to be limiting, as those skilled in the art will recognize that various colors, color combinations, hatching, sensor parameters, and/or metrics may be used to develop volumes or other diagrams that represent the unique patterns or distinctive signatures of maneuvers performed.

In some embodiments, data processing occurs such that a classification or assignment of the first platform state may be given based on known nomenclature, known classifications, or meaningful representations currently used by operators to describe a state of their vehicle. In some embodiments the various respective states may be classified or assigned with respect to a second vehicle. For example, referring now to FIG. 4, a pilot referring to formation flight may define a position of a second aircraft 130 with respect to a first aircraft 126. For instance, the pilot may describe the second aircraft 130 as "sucked" because it is behind a 45-degree bearing line 128 defined with respect to the first aircraft 126. In other embodiments (e.g., FIG. 5, below), the pilot may describe the second aircraft 130 in front of the bearing line 128 as "acute". By way of another example (not shown), the pilot may describe the first aircraft that is getting incrementally closer to the second aircraft as "closing", and if the increments are getting smaller at a rapid rate then the first aircraft may be described as "closing too fast." Accordingly, a data processor 122 similarly classifies or assigns states based on the before-mentioned meaningful representations, classifications, nomenclature, or combinations thereof, which may include, but are not limited to, engaged, disengaged, lock-on, sucked, closing, closing too fast, and acute In some embodiments, there may be similarities between the representations. For example, representations of "turn into" and "turn away" may depict maneuvers that include a continuous set of corrections that attempt to keep the second aircraft 130 in a correct position throughout a turn. In this regard, data processor 122 may assign or classify (e.g., the first platform state) based on similarities. In other embodiments, the sample-based representations will have distinct differences. For example, the "break-up" representation may exhibit a distinctly different pattern than the "turn into" and "turn away" patterns because this maneuver is designed to generate separation between two aircraft. In this regard, data processor 122 may assign or classify based on distinctions.

In some embodiments, data processor 122 analyzes, segments, parses, and/or classifies data using geometry and/or linear transformations and the first platform state. For example, referring again to FIG. 4, the first aircraft 126 may have coordinates (x1,y1). Due to the definition of slope, if the second aircraft 130 having coordinates (x2,y2) fell on the bearing line 128 then the following relationship would be true:

$$1 = \frac{y2 - y1}{x2 - x1}$$

In such a case, data processor 122 may assign an "in formation" classification to the first platform state.

By way of another example, in embodiments the second aircraft 130 may fall somewhere other than directly on the bearing line 128, or a combined state of the second aircraft 130 may exist such as "in formation/closing too fast" as it approaches the first aircraft 126. In this regard, a simple linear transformation algorithm may be utilized together with the bearing line 128 or a distance formula to classify the second aircraft 130 with respect to the first aircraft 126. For instance, the distance between the aircraft may be computed according to the following:

$$d = \sqrt{(x2-x1)^2 - (y2-y1)^2}$$

Figure 4:
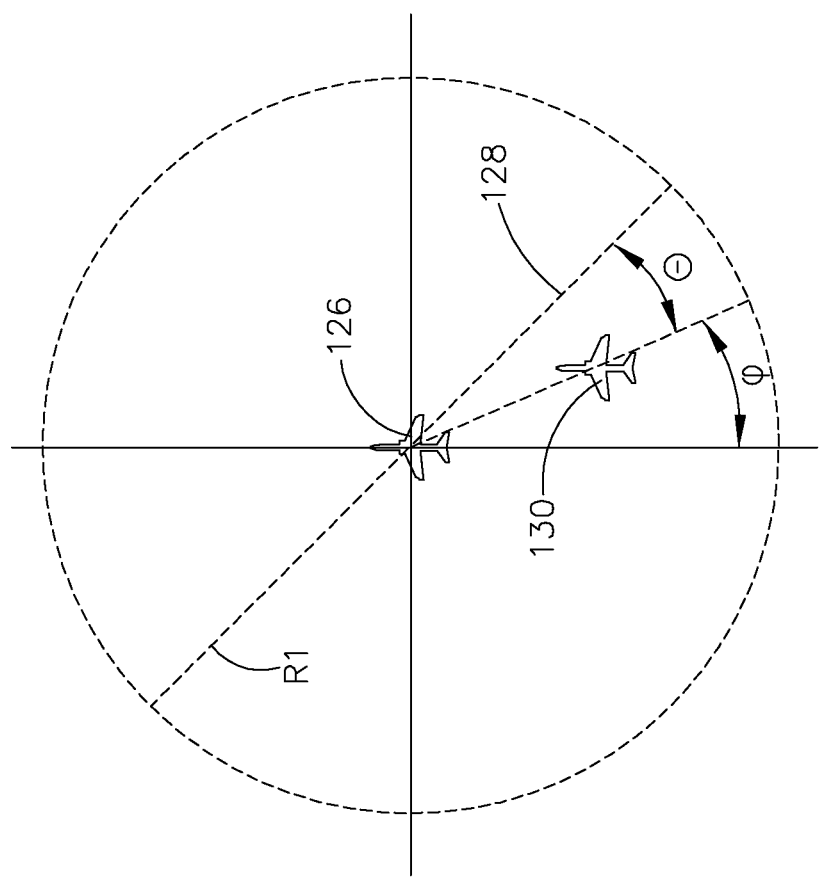
FIG. 4 is an exemplary embodiment of a classification for a vehicle state, according to the inventive concepts disclosed herein.
Figure 5:
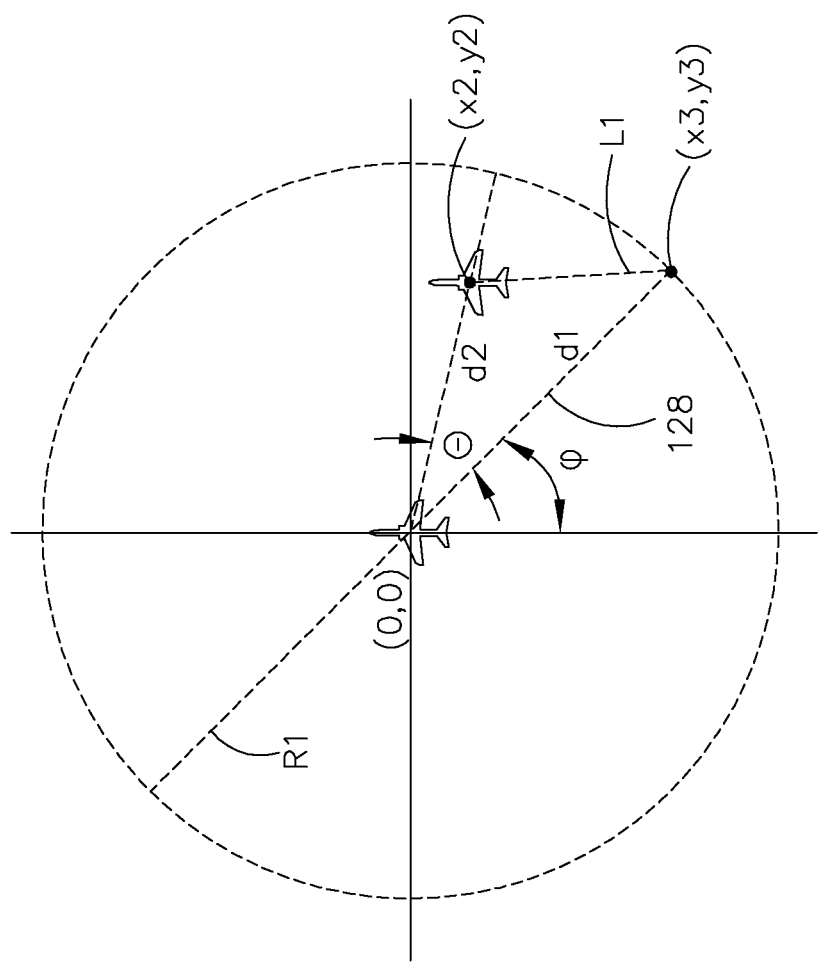
FIG. 5 is an exemplary embodiment of a classification for another vehicle state, according to the inventive concepts disclosed herein.

In some embodiments, in order to prevent continuous calculation of distance of separation between aircraft, a threshold distance of separation R1 between the first aircraft 126 and the second aircraft 130 may be set such that once the second aircraft 130 passes or comes within the threshold distance R1 a loop calculator begins to iteratively calculate and recalculate the distance between the first aircraft 126 and second aircraft 130. The threshold distance R1 is depicted in FIG. 4 as a radius surrounding the first aircraft 126, but other distance representations (e.g., rectangular envelopes, ovals, etc.) are intended to be encompassed by the inventive concepts disclosed herein.

In an exemplary embodiment, because the speed of at least the second aircraft 130 will be known (e.g., due to first portion of data acquisition phase), a rate of change of the separation between the first and second aircraft may be calculated at the corresponding speed. If that rate of change is greater than a threshold rate of change, then an output of "closing too fast" may result.

Pseudocode for the processing of speed and rate of change of distance to produce a state of "closing too fast" may be represented as follows:

S=speed of aircraft//variables correlating to definitions or sensor data
R=threshold distance//set by operator or calculated based on aircraft type
C=threshold rate of change//this may be from a table where C corresponds to a value of S
if d<R1//condition for beginning loop
  i=1;
  while i≥1, di=$\sqrt{(x2-x1)^2-(y2-y1)^2}$;
  d1=di;
  i=i+1;
    if di−d1>C;
    print "Closing too Fast";
    if d>R1;
    Stop By way of another example, referring now to FIG. 5 the second aircraft 130 may come within the threshold distance R1. If the first aircraft 126 is determined to be the point of reference (e.g., origin (0,0) or (0,0,0) corresponds to the first aircraft position), and the bearing line 128 extends to the radius, R1, such that the line 128 intersects R1 at point (x3, y3), then the state of the second aircraft 130 is measured with respect to the first aircraft 126 and the bearing line according to the following:

$$\sin\varphi = \frac{x3}{d1} \quad (1)$$

$$\cos\varphi = \frac{y3}{d1} \quad (2)$$

$$x2 = d2\sin(\varphi+\theta) = d2(\sin\varphi\cos\theta - \sin\theta\cos\varphi) \quad (3)$$

$$y2 = d2\cos(\varphi+\theta) = d2(\cos\varphi\cos\theta - \sin\varphi\sin\theta) \quad (4)$$

and inserting equations (1) and (2) into equations (3) and (4) provides:

$$\begin{bmatrix} x2 \\ y2 \end{bmatrix} = \begin{bmatrix} \frac{d2}{d1}\cos\theta & \frac{d2}{d1}\sin\theta \\ \frac{d2}{d1}\cos\theta & -\frac{d2}{d1}\sin\theta \end{bmatrix} \begin{bmatrix} x3 \\ y3 \end{bmatrix} \quad (5)$$

Using global position system (GPS) data and inertial measurement unit (IMU) data, the length L1 the second aircraft 130 travels may be known or computed. Because all three sides of the triangle formed relating the second aircraft 130 to the first aircraft 126 are known or computed, the law of cosines may be used to determine the Heading Crossing Angle (HCA), θ, according to the following:

$$\cos\theta = \frac{d_2^2 + d_1^2 - L_1^2}{2d_2d_1}$$

In the above example, the second aircraft 130 is too far forward in formation, or the HCA, θ, is greater than 45° from the longitudinal axis of the first aircraft 126; thus, the data processor 122 classifies the second aircraft 130 as "acute."

Referring again to FIGS. 2 and 3, in some embodiments the data processor 122 may segment, slice, analyze, aggregate, and form sample-based representations 132 of operator input and sensor data and correlate the sample-based representations 132 with a maneuver performed and/or with the first platform state. The correlations may be based on a common factor such as a time or an altitude when the input is received, the maneuver is performed, or the first platform state occurred. Another common factor utilized may be an operator who is performing the maneuver. Other common factors tying a maneuver, an operator input, and the first vehicle state together will be recognized by those skilled in the art, and are encompassed by the inventive concepts of the present disclosure.

It is noted that FIG. 2 depicts the sample-based representation 132 as a single input provided to a portion of the machine learning sub-system implementing the state estimator 134. This depiction is not meant to be limiting as the sample-based representations may be from operator data, sensor data, isolated control commands for one or more specific maneuvers, grading data for the one or more specific maneuvers, and combinations thereof.

In some embodiments, as a maneuver may be performed multiple times (e.g., two, three, or 100 times) during the data acquisition phase, additional processing may be necessary. For example, a cluster analysis may be performed on the acquired data using a clustering algorithm such as hierarchical clustering, linkage clustering, centroid clustering (e.g, k-means clustering), distribution-based clustering, density-based clustering, or combinations thereof.

State Estimation

In some embodiments, the system 100 uses the sample-based representations of operator input 132 and the classifications of the first platform state from data processor 122 to estimate a second state of the platform 108. The second state of the platform 108 may be based on the known nomenclature or the known classifications used with respect to the first platform state. Second states of the platform 108 may occur during real-time observations or during runtime operation.

Referring now to FIG. 3, in some embodiments the classifications of the first platform states are used as inputs into the machine learning subsystem 104 as operational representations. For example, system 100 may include a state estimator module 134 or state estimator circuitry (e.g., ASIC). The state estimator module or circuitry may incorporate one or more machine learning algorithms to estimate the second platform state. For instance, a neural net may input state data (from data acquisition and data processing phases) and output a series of control commands to one or more control systems of the vehicle, where the series of control commands mimic, trace, or train against the operator response data acquired during the data acquisition phase.

In other embodiments, the state estimator 134 (FIG. 2) may incorporate a Viterbi algorithm, a Markov model, a hidden Markov model, a Markov chain, or other algorithms for estimating paths, states, or metrics of observations. For example, a path $$X=(x_1,x_2,\ldots,x_N)$$

may be found using a Viterbi algorithm such that observed operator input may make up the observation space $$O=\{o_1,o_2,\ldots,o_N\}$$

and the classifications, such as "acute", "sucked", "information", etc., (known and unknown) may make up the state space $$S=\{s_1,s_2,\ldots,s_K\}$$

with an array of initial probabilities $$\Pi=(\pi_1,\pi_2,\ldots,\pi_K)$$

where $\pi_i$ is the probability that $x_1=s_i$.

In some embodiments, one or more techniques or algorithms may be used to prevent the machine learning algorithm (e.g., neural net) from overfitting the data. For example, regularization may be used together with the machine learning algorithm. In this regard, a loss metric L(X,O) may be used, where X is the design matrix and O is the observations or targets vector, and regularization comes into play as a multiple of a weight vector (ω) is used according to the following:

$$L(X,O)+\lambda N(\omega)$$

where cross-validation may be used to tune the regularization term λ. It is noted that the weight vector (ω) may include, but is not limited to: a weighting based on a standard deviation between sample-based representations of one or more maneuvers performed; a weighting based on scores assigned to maneuvers performed such as those provided by instructor/evaluator input; a weighting of scores based on how well output tracks or trains against training data; error associated with the first, second, or third components for acquiring 116, 118, or 120; error associated with the observation sub-system 102; error associated with the machine learning sub-system 104; error associated with the control sub-system 106; or combinations thereof.

In some embodiments, second states of the platform 108 may be based on unknown nomenclature, unknown classifications, or unknown operational representations that are not currently in use. For example, the state estimator may incorporate fuzzy logic or one or more hidden nodes such that the estimated state of the aircraft lies somewhere between two or more previously known states. In this regard, the second maneuver determined by the platform may include an estimated maneuver that lies correspondingly between two or more previously known maneuvers. By way of another example, the estimated state may lie above/below a previously known state and the estimated maneuver may lie above/below a previously known maneuver. Depending on the success of the maneuver or the combination of maneuvers, or the accuracy of the estimated state, system 100 may assign a classification or prompt an operator to classify the maneuver, the series of maneuvers, or the estimated state (if previously unknown). Newly classified maneuvers, series of maneuvers, or estimated states may be available for subsequent cycles of estimating the second state of the platform 108 as subsequent input for the neural net or for subsequent cycles of the maneuver controller (e.g., 136 below).

In some embodiments, completion of the data acquisition may trigger or enable an ability of system 100 to perform state estimation to estimate the second platform state. It is noted that although the ability to perform state estimation is enabled, the state estimation may not actually occur until a triggering event occurs. For example, with state estimation enabled, system 100 may not actually estimate the second platform state until formation flight for a mission begins, until an unfriendly foe is encountered, or until a threshold distance of separation (e.g., R1) is crossed.

In some embodiments, estimation of the second platform state may be estimated sequentially with respect to the data acquisition and the first platform state. Further, the state estimation and data acquisition may occur in a single instance of operation (e.g., while performing a mission). For example, the data acquisition phase may occur during a calibration of system 100 that takes place soon after a pilot embarks on a mission (e.g., at a point in the mission when it is known that unfriendly forces will not be encountered). During the calibration, one or more maneuvers may be performed in response to the first platform state and responsive vehicle operator input recorded. The vehicle (e.g., platform 108) may refuel, or proceed directly after the recording of calibration maneuvers to perform the mission.

In other embodiments, the second state of the platform 108 may be estimated sequentially and at separate instances of operation. For example, a pilot may conduct a training exercise in order to enable the acquiring of vehicle operator data and vehicle/operator input responsive to the first platform state. In this regard, the pilot may receive orders days, weeks, or months later to conduct a mission, and the stored data acquired in the data acquisition phase (e.g., during training) may be used to estimate the second platform state as operations are carried out for the mission.

It is noted that FIG. 2 depicts the machine learning sub-system 104 implemented in three separate components or modules of system 100. This depiction is not meant to be limiting. For example, the machine learning sub-system may be implemented as a single sub-system communicatively and operatively coupled to receive input (e.g., from first, second, or third components for acquiring) to enable sequential machine learning, using a different input in the machine learning algorithm (e.g., neural net) each cycle. By way of another example, the machine learning sub-system 104 may be implemented in multiple (e.g., two, three, four, or more) separate components or modules of system 100 in order to enable the machine learning required for a first phase of system 100 to be performed simultaneous with the machine learning of a second phase. For example, the determination and learning of good and bad maneuvers in the evaluation phase (below) may utilize a separate machine learning module 135 such that machine learning for the state estimation phase may be simultaneous with the machine learning of the evaluation phase. It is further noted that those skilled in the art will recognize portions of the machine learning disclosed herein that may be 1) separated to further enable simultaneous performance of machine learning, or 2) combined to enable sequential performance of the machine learning disclosed herein. Each of these different arrangements are intended to be encompassed by the inventive concepts disclosed herein.

Maneuver Performance

In some embodiments, a portion of the machine learning sub-system 104 is tasked with determining a maneuver to perform. For example, output from the state estimator 134 may be input into a maneuver controller 136. The maneuver controller 136 may be tasked with determining whether the output from the state estimator 134 results a maneuver (e.g., M1, M2, . . . Mn) that is safe. By way of another example, the maneuver controller 136 may be further tasked with determining which maneuver of two or more safe maneuvers should be performed based on a quality metric. For instance, only one of the two or more maneuvers is performed based on a determination of which maneuver is associated with the higher of the two scores. In this regard, a maximum or minimum function is utilized to determine control commands corresponding to the maneuver with the highest or lowest score such that the higher commands are output.

In some embodiments, the input into controller 136 is based on weight together with an assigned score. For example, a scored maneuver may also have a weight associated with it indicating how well the machine learning sub-system 104 is able to trace the maneuver. In this regard, if two possible maneuvers have the same score, the maneuver controller 136 decides which to perform based on the weight associated with the maneuver.

In an exemplary embodiment, the maneuver controller 136 outputs vehicle control commands to a failsafe vehicle controller for performing the vehicle control commands. For example, the maneuver controller 136 may output one or more flight control commands to an autopilot 138.

Evaluation

Figure 6:
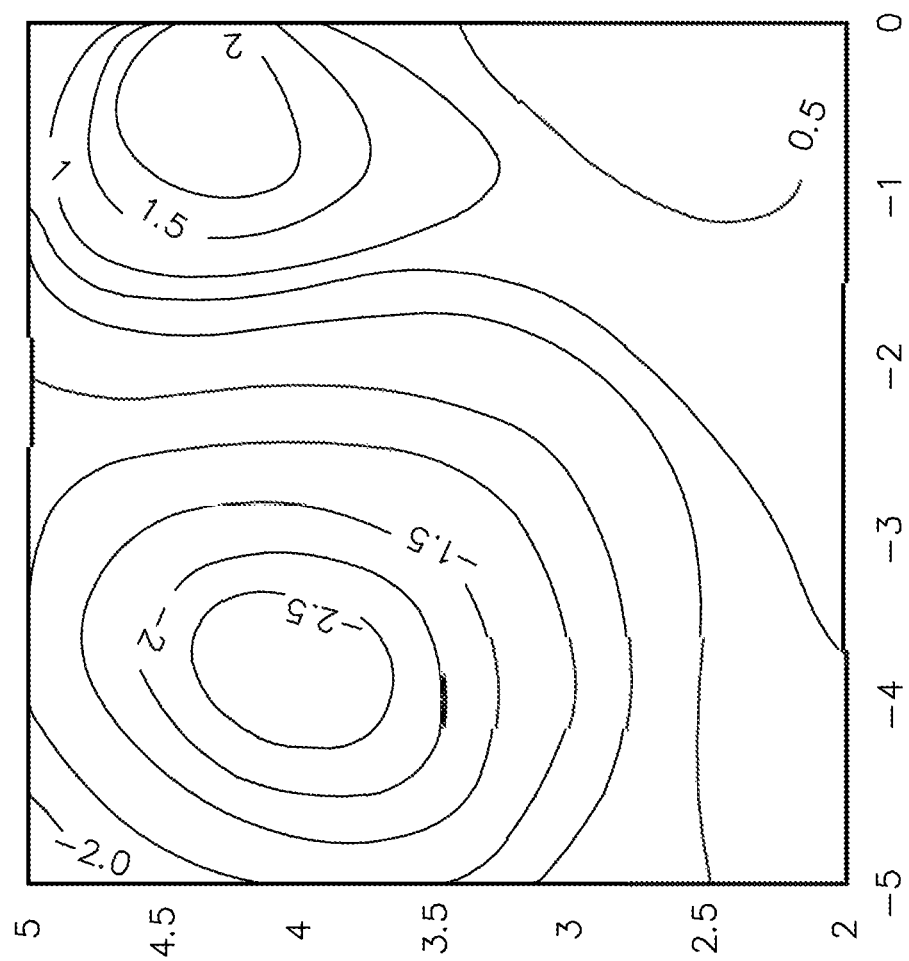
FIG. 6 is an exemplary embodiment of a gradient, according to the inventive concepts disclosed herein.

In some embodiments, the score upon which the maneuver controller 136 bases maneuver performance may be assigned by an evaluator module 140. The evaluator module 140 receives as input instructor/evaluator data. In some embodiments, it receives the instructor/evaluator data from the third components for acquiring 120. In other embodiments, the evaluator module 140 learns its own instructor/evaluator data based on sample-based representations of the input evaluator/instructor data. For example, a sample-based representation may include multiple (e.g., 100) examples of good maneuvers and multiple (e.g., 100) examples of bad maneuvers. Using these examples and a metric for scoring them, a gradient may be formed. For instance, referring now to FIG. 6, a three-axis metric may be used such that a first axis represents a score for good maneuvers, a second axis represents bad maneuvers, and a third axis (e.g., peaks and valleys as represented by the contour lines in FIG. 6) represents a sub-characteristic for determining the quality of a good maneuver or the quality of a bad maneuver (e.g., weight). It is noted that the identifiable characteristics may include, but are not limited to, a correct or incorrect separation distance, elevation, bank angle, or speed associated with a respective maneuver.

In some embodiments, a score assigned may be based on a single factor, such as evaluator or instructor data. In other embodiments, the score may be based on multiple factors, such as safety, fuel economy, ease of execution, or combinations thereof. For example, a first break-up maneuver may be safer than a second break-up maneuver if the first "break-up" maneuver maintains a larger degree of separation between two aircraft. By way of another example, a first "turn away" maneuver may be easier to execute than a second "turn away" maneuver because a bank angle associated with the first maneuver is less than a bank angle associated with the second maneuver. Those skilled in the art will recognize other factors upon which scores may be based, each of which are encompassed by the inventive concepts disclosed herein.

In some embodiments, a reinforcement learning sub-system 142 (see FIG. 2) utilizes the gradient and a machine learning algorithm such as a neural net to improve the maneuver performance of the maneuver controller 136. For example, the gradient may be an environment with a set of states (e.g., scores) and the reinforcement learning sub-system 142 may be configured to recognize a set of actions (e.g., possible maneuvers) and the reinforcement learning sub-system 142 may learn from one or more actions selected to maximize a reward function (e.g., value-based maximizing function) or based on optimizing scores such that the highest or lowest scores are associated with maneuvers performed by the maneuver controller 136.

In other embodiments, the reinforcement learning sub-system 142 (see FIG. 2) utilizes the gradient or the neural net to improve the estimation of the second platform state by the state estimator 134. For example, the reinforcement learning sub-system 142 may be programmed to perform reinforcement learning using grading data associated with verbal input given after a pilot's incorrect determination of the aircraft state.

In some embodiments, the evaluator module 140 and/or the reinforcement learning sub-system 142 uses cluster analysis similar to the data processor 122. This cluster analysis may further enable a determination of similarities and distinctions between good and bad maneuvers for "self-grading".

It is noted that the combination of "self-grading" together with reinforcement learning may allow random excursions to improve the robustness of the machine learning algorithms and solutions, where the random excursions may be graded, "self-graded", or monitored for safety such that further improved performance is obtainable.

In some embodiments a visual method may be used to determine the quality of the training or mimicking of the output to the operator input. For example, color-based graphs may indicate differences between operator input data and the output of the neural net, indicating the quality of the training. The color-based graphs may be computationally analyzed by assigning bits to colors (e.g., 8-, 16-, or 24-bit color mapping). In other embodiments, a mathematical measurement of a quality of the training solution may be calculated to determine the loss between the operator data and the training data.

Figure 7:
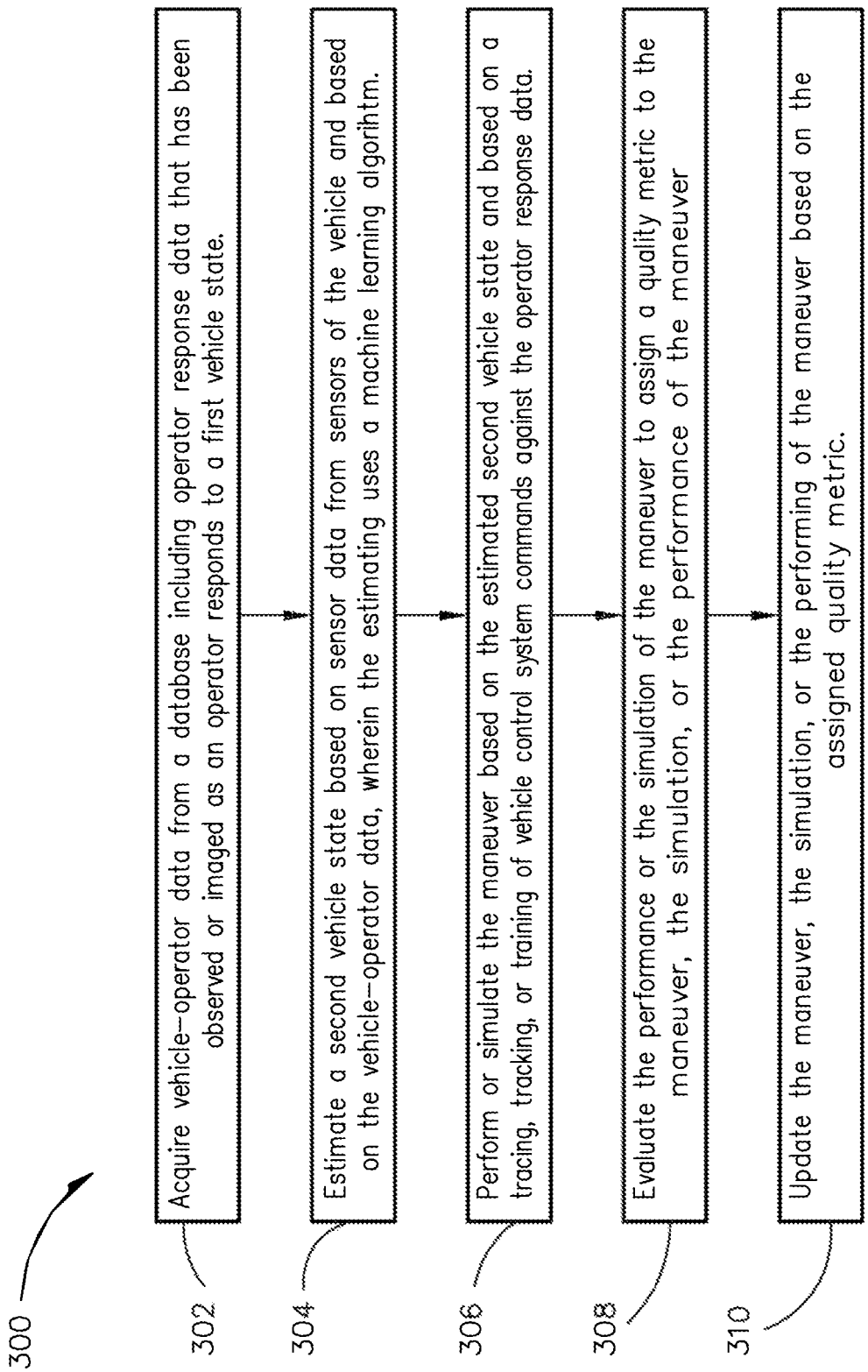
FIG. 7 is an exemplary embodiment of a method for learning practical autonomy, according to the inventive concepts disclosed herein.

Referring now to FIG. 7 an exemplary embodiment of a method 200 according to the inventive concepts disclosed herein may include one or more of the following steps. For example, the method 200 may be a method for learning practical autonomy.

A step 202 may include acquiring vehicle-operator data. For example, the vehicle-operator data may be acquired from a database including operator response data that has been observed or imaged as an operator responds to a first vehicle state. For instance, a pilot's movements of a throttle or a control stick may be imaged for subsequent sampling, data processing, and machine learning in order to provide a target to trace, mimic, or train vehicle control output against. In some embodiments, the pilot's movement of the throttle or control stick may be characterized as operator response data.

Figure 8:
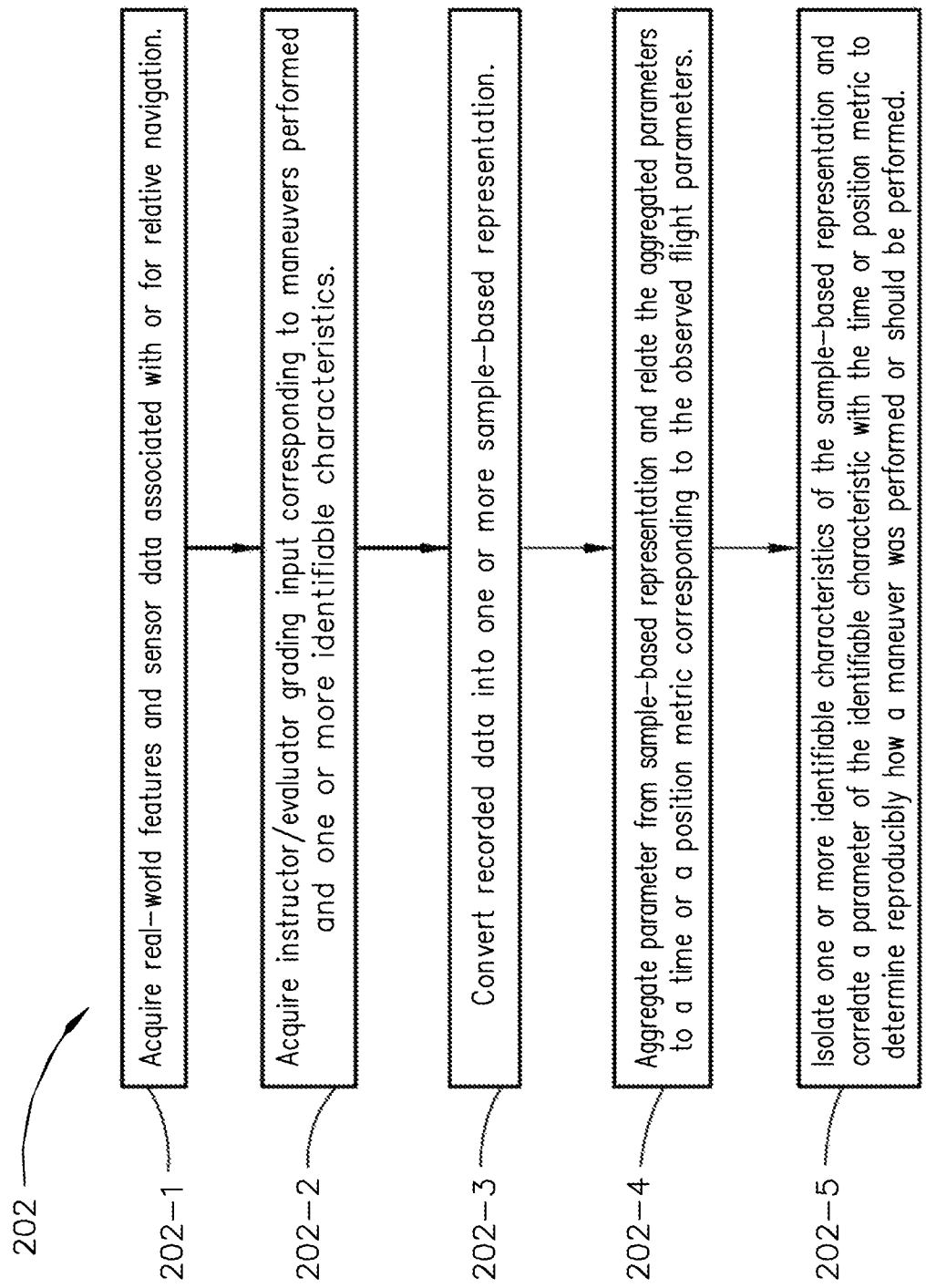
FIG. 8 is an exemplary embodiment of sub-steps of the method of FIG. 7, according to the inventive concepts disclosed herein.

In some embodiments, step 202 may include one or more sub-steps. For example, referring now to FIG. 8, step 202 may include sub-steps 202-1 to 202-5. A sub-step 202-1 may include acquiring real-world features and sensor data for relative navigation (RELNAV) and absolute position determination (e.g., from GPS or a differential GPS system). For example, the real-world features may include an image of an aircraft, an aircraft wing, or an aircraft tail. By way of another example, the real-world features may include an image of a position of a throttle, a control stick, or an operator's hand responsive to a first aircraft state.

In some embodiments, the sensor data acquired may include data that corresponds to operator input responsive to the first vehicle state. For example, altitude, speed, heading, position, radar data, and other sensor input may be acquired and stored during an operator's response to the first aircraft state.

A sub-step 202-2 may include acquiring instructor/evaluator grading input that corresponds to maneuvers performed responsive to the first aircraft state. For example, the maneuvers performed may include identifiable characteristics such as a distance, elevation, speed or bank angle, and the instructor/evaluator grading input may indicate whether the maneuver performed included correct or incorrect identifiable characteristics on a predetermined grading scale (e.g., 1 to 100, 1 to 5, −5 to 5, etc.).

One or more sub-steps of step 202 may encompass a data processing sub-step. For example, sub-step 202-3 may include converting recorded data into one or more sample-based representations. For instance, two- or three-dimensional recorded flight track data may be sampled, sliced/segmented, classified, and converted into one or more representations for each slice/segment, where each slice/segment includes operator input such as degree or amount of right or left turn versus (or correlated with) sensor data output such as meters above, behind, left, or right of lead. In this regard, the sample-based representations may also represent nomenclature correlated with a vehicle state, and/or evaluator input such as one or more scores from a grading scale correlated with maneuvers or identifiable characteristics of the maneuvers. By way of another example, the data processing sub-step may include sub-step 202-4. Sub-step 202-4 may include aggregating parameters from multiple sample-based representations, where the multiple sample-based representations are related to the same maneuver (e.g., "break-up" maneuver). For instance, the operator input from several different pilots may be aggregated and compared to determine how the same maneuver is performed by different pilots. In yet another example, the data processing sub-step may include sub-step 202-5. Sub-step 202-5 may include isolating identifiable characteristics of the multiple sample-based representations to determine how each identifiable characteristic is performed or related to the maneuver of sub-step 202-4. In this regard, roll, pitch, or throttle input may be an identifiable characteristic that is isolated, where the isolating includes determining how a parameter of the identifiable characteristic (e.g., angle of bank) correlates with time or a position metric (e.g., distance behind/above/left/right of lead).

A step 204 may include estimating a second vehicle state based on sensor data from sensors of the vehicle and based on the vehicle-operator data. The estimating may use a machine learning algorithm such as a neural net. For example, a neural net may input one or more sample-based representations of an aircraft in an "acute" state (see FIG. 5) and may base a real-time or run-time aircraft state on the one or more sample-based representations of the aircraft in the "acute" state. For instance, using a geometrical relationship of a wingman aircraft to a lead aircraft correlated to or compared with the one or more sample-based representations, the neural net may output an estimated second state of the aircraft, such as "acute" or "acute and closing too fast". In this regard, the geometrical relationship may be determined using the sensor data from the sensors of the vehicle.

In some embodiments, the estimating of step 204 and the isolating and correlating of step 202 (e.g., sub-step 202-5) may indicate how to reproducibly perform the maneuver when a vehicle is in a similar state to the first vehicle state. For example, if a wingman aircraft were in a first state and multiple pilots correctly began applying approximately 5-degrees of bank angle at time "T+5" seconds or at distance "D5", where "T+5" may be a time measured with respect to a point-in-time when the first state was determined and "D5" is a distance measured with respect to a lead aircraft associated with the first state, then a neural net could produce an output for a wingman aircraft such that when the wingman aircraft is estimated to be in a second state that is similar to the first state, the output would train against the approximation of 5-degrees of bank angle at a time "T+5" after the second state is estimated or at a distance "D5" relative to a lead aircraft associated with the second aircraft state.

A step 206 may include performing or simulating the maneuver based on the second vehicle state estimated in step 204. For example, the performance or simulation of the maneuver may be accomplished using a maneuver controller that traces, mimics, tracks, or trains an output against one or more inputs of a neural net. For instance, an output of a neural net may be one or more vehicle control system commands that train against the operator response data acquired in step 202.

A step 208 may include evaluating the performance or the simulation of the maneuver to assign a quality metric to the maneuver, the simulation, or the performance of the maneuver. In some embodiments, the evaluating may be of calibration data. In other embodiments, the evaluating may be of data responsive to a first vehicle state or a second vehicle state.

Figure 9:
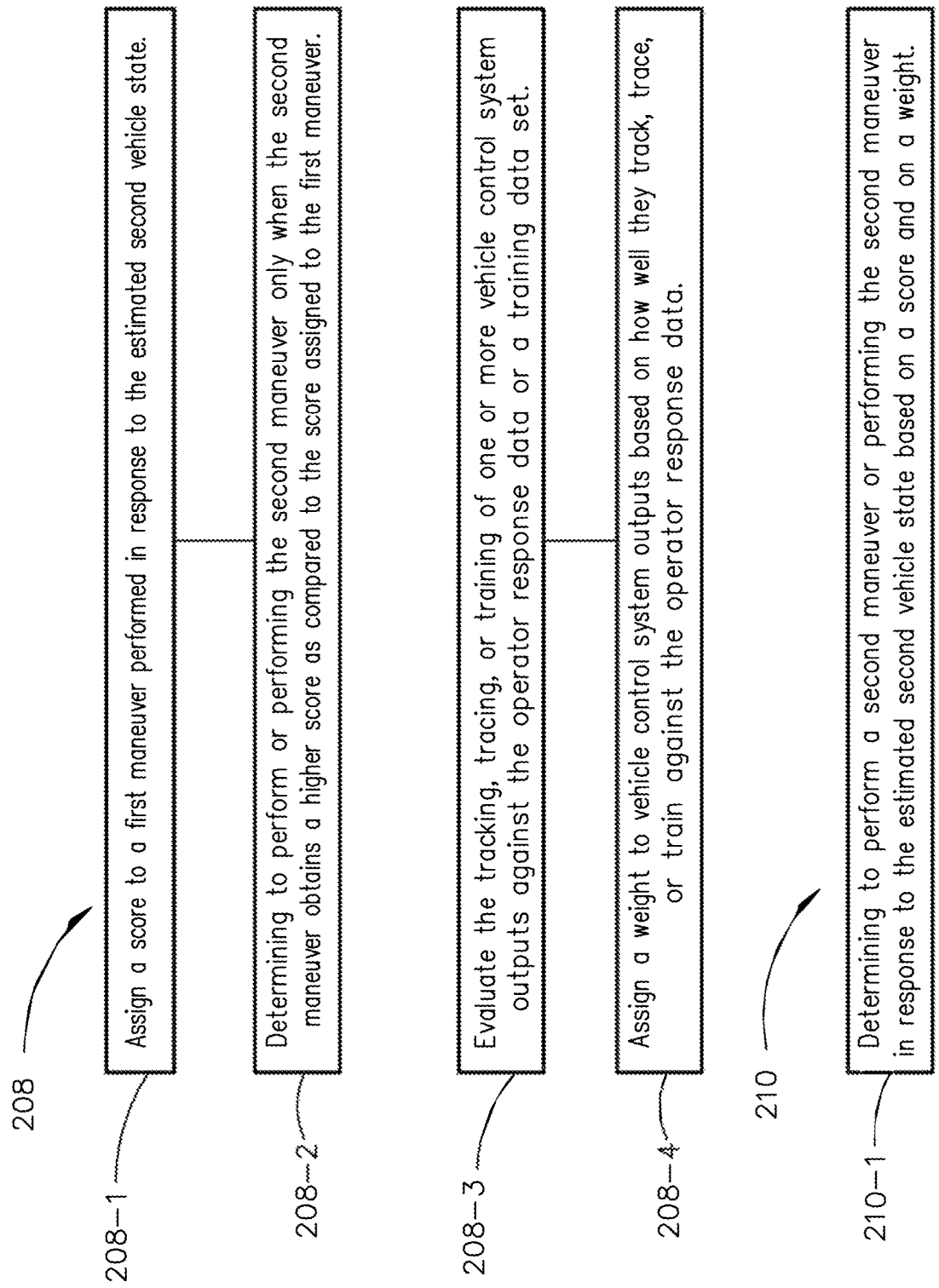
FIG. 9 is an exemplary embodiment of sub-steps of the method of FIG. 7, according to the inventive concepts disclosed herein.

In some embodiments, step 208 may include one or more sub-steps. For example, referring now to FIG. 9, sub-step 208-1 may include receiving input that assigns a score to a first maneuver performed in response to the first vehicle state or the estimated second vehicle state. In some embodiments, this input may be from an instructor tasked with grading a UAV's performance of a maneuver the UAV is told to perform. In other embodiments, this input may be from an evaluator module configured to perform "self-grading". A sub-step 208-2 may include determining to perform or performing a second maneuver only when the second maneuver obtains a higher score than a score assigned to a first maneuver. For instance, the evaluator module may receive two values/scores, each value/score associated with an output for a first or a second maneuver. In this regard, a first value/score may be for an instructor-graded maneuver responsive to the second estimated state, and a second value/score may be for a "self-graded" maneuver as estimated by the machine learning sub-system and the control sub-system 106 responsive to the second estimated state. In this regard, the output for the "self-graded" maneuver is only output to the maneuver controller if the evaluator module indicates that the first value/score is higher than the second value/score, where the values/scores use a same or a similar grading scale.

In some embodiments, step 208 includes sub-step 208-3. Sub-step 208-3 may include evaluating the tracking, tracing, or the training of one or more vehicle control system commands against the operator response data acquired in step 202. For example, the output of the maneuver controller for a maneuver performed may be compared by the evaluator module to an input training data set (e.g., a set of data against which output is trained against). Sub-step 208-4 may include assigning a weight to a vehicle control system output based on how well the output tracks, traces, or trains against the input. For example, if the comparison indicates accurate or good tracing of output to input, then a score that corresponds to the output may be weighted high. If the comparison indicates poor tracing of output to input, then the score associated with the output may be weighted low.

In some embodiments, the step 208 may include evaluating actions taken by a module of system 100 incorporating a machine learning algorithm. For example, the state estimator module may incorporate a neural net for estimating a state of an aircraft or other platform. An estimation of a state by the state estimator module may represent an action of multiple possible actions, and the evaluator module may evaluate whether the state is the best state based on a score or a weight associated with the state. For instance, a best state between two estimated states such as "closing" and "closing too fast" may be determined based on a weight associated with a rate of change of a separation distance between two aircraft, where higher weights are associated with higher rates of change and lower weights are associated with lower rates of change. In this regard, the probability that the best state is "closing too fast" increases with the increasing weight.

A step 210 may include updating the maneuver, the simulation, or the performing of the maneuver based on the assigned quality metric. For example, updating the maneuver may include enabling the maneuver controller to perform maneuvers based on the score associated with the maneuver and the weight associated with the score. By way of another example, updating a simulation may include enabling a simulation engine to simulate maneuvers based on score and on weight associated with the score.

In some embodiments, step 210 may include updating the state estimator module to estimate a state based on a score and a weight. For example, the state estimator module may estimate a second vehicle state that is graded (e.g., "self-graded" or instructor graded), receiving a score based on how well it approximated the actual state of the vehicle. This may occur as a result of instructor input based on a review of footage, radar returns, or flight track data. This instructor input may enable the system to learn from the input what makes a good and a bad estimated state (e.g., from a resulting gradient), enabling future "self-grading" and improving of the estimated state based on scores of subsequent estimated second vehicle states. In this regard, the subsequent estimated vehicle states may be compared against a training data set to assign a weight to those estimated vehicle states that more closely resemble actual second vehicle states. The updating by the reinforcement learning module may enable the state estimator module to take the assigned weight into account in subsequent state estimations.

It is noted that not just the state estimator module, but any module associated with at least steps 204, 206, or 208 may involve an element of machine learning. In this regard, modules associated with these steps may take actions based on a probability (e.g., represented by a Boltzmann distribution, or other probability distribution type), where there is a degree of randomness within the probability function. In this regard, the updating performed by the reinforcement learning module may include updating modules associated with steps 204, 206, or 208 (e.g., state estimator, maneuver controller, state evaluator) based on available actions, the reward function, and based on actions taken after a determined state of the machine learning algorithm implemented by the respective module.

It is further noted that the stochastic nature of the machine learning algorithms implemented within the respective modules ensures that at least in some embodiments, the actions taken by the respective modules are repeatedly evaluated and the reinforcement learning module is similarly repeatedly updating respective modules based on the actions taken and associated scores or weights to maximize the reward function associated with the reinforcement learning module, thereby optimizing the machine learning algorithms associated with the respective modules.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system for learning practical autonomy, comprising:
  a machine learning module comprising an implicit machine learning algorithm, the machine learning module configured to perform or direct steps, the steps comprising:
    receiving one or more inputs to generate an output that tracks or trains against the one or more inputs, the one or more inputs including operator response data and the output including one or more control system commands, at least one input of the one or more inputs received from an observing or imaging subsystem;
    assigning or classifying a state based on a sample-based representation that correlates the operator response data to the state; and
    evaluating one or more maneuvers responsive to the state to generate an evaluation gradient; and
  a control system communicatively coupled to the machine learning module to receive the one or more control system commands and perform a maneuver for a machine based on the evaluation gradient, wherein the operator response data comprises first operator response data, second operator response data, and third operator response data, and wherein the sample-based representation comprises a first sample-based representation, a second sample-based representation, and a third sample-based representation, the state comprises a first platform state and a second platform state, the second operator response data comprises first vehicle control system commands and second vehicle control system commands, and the second sample-based representation correlates the first vehicle control system commands to a first maneuver, and wherein the second platform state is estimated based on the first vehicle control system commands and vehicle sensory data to implicitly generate second vehicle control system commands to perform a second maneuver responsive to the estimated second platform state.

2. The system of claim 1, wherein the first operator response data comprises nomenclature or terms recognized by operators, and the first sample-based representation correlates the nomenclature or terms to the state.

3. The system of claim 2, wherein the nomenclature or terms include at least one of: engaged, disengaged, lock-on, sucked, closing, closing too fast, and acute.

4. The system of claim 1, wherein the vehicle comprises a simulated vehicle, the sensory data comprises simulated sensory data, the first maneuver comprises a simulated maneuver and the second maneuver comprises a maneuver performed by an aircraft in real-time.

5. The system of claim 1, wherein implicitly generating second vehicle control system commands comprises accessing observations or images of the first vehicle control system commands from the observing or imaging sub-system and inferring the second vehicle control system commands based on the first vehicle control system commands responsive to the first platform state.

6. The system of claim 5, wherein the first vehicle control system commands are a result of human logical reasoning responsive to the first platform state and the second vehicle control system commands are inferred by the implicit machine learning algorithm, the implicit machine learning algorithm comprising a neural net.

7. The system of claim 1, wherein the third operator response data comprises instructor grading input including an assigned score, and the third sample-based representation correlates the instructor grading input and the assigned score to one or more maneuvers performed responsive to the state to generate the evaluation gradient.

\* \* \* \* \*